Dec. 9, 1969     L. H. McCALL, JR     3,482,809
MOUNTING FIXTURE
Filed July 31, 1967

*INVENTOR.*
LOYD H. McCALL, JR.
BY
Agent

United States Patent Office 3,482,809
Patented Dec. 9, 1969

3,482,809
MOUNTING FIXTURE
Loyd H. McCall, Jr., Smyrna, Ga., assignor to Lockheed Aircraft Corporation, Burbank, Calif.
Filed July 31, 1967, Ser. No. 657,326
Int. Cl. E04g 3/00; A01k 97/10; A47b 96/06
U.S. Cl. 248—216                               5 Claims

ABSTRACT OF THE DISCLOSURE

A fixture to mount wire harnesses, hydraulic tubing, ducting, etc., is provided that is capable of being directly attached to a support surface whose structural design prohibits drilling large size holes for conventional clip mounting. This fixture is bonded and riveted to the structure with the bond serving as a carrier to prevent fatigue of the structure around the rivet holes. The rivets in addition to providing a fail-safe feature also prevent motion of the fixture that would tend to destroy the bond.

---

Figure 1:
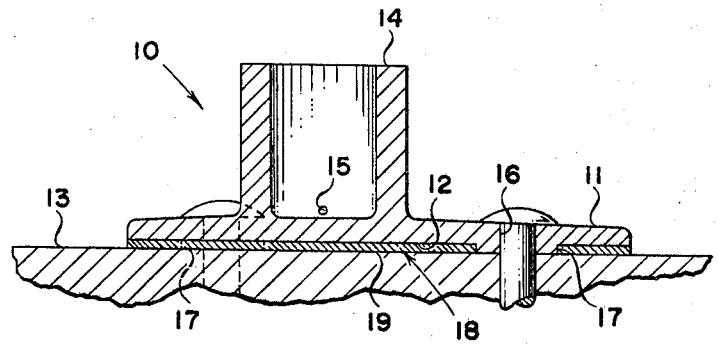

This invention relates to supporting fixtures adapted to removably connect and mount articles to stationary structure, and more particularly to such a fixture which is capable of being anchored to the surface of a supporting structure, such as a bulkhead, frame, wall, or the like, formed or fabricated of fatigue critical material to the end that articles of maximum weight may be safely mounted thereon and maintained intact over a prolonged service life.

While not limited to, the present invention offers particular utility in aircraft and similar applications where weight is an important, and in some instances a vital, consideration. In these applications, bulkheads, framing and internal structure is designed to stringent weight to strength ratios, and where mounting fixtures or brackets, etc., are required to be secured thereto through fasteners such as bolts, rivets, etc., the adjacent structure is often incapable of supporting the required or intended load. This situation becomes even more acute after a reasonable service period with the conventional type of fastener connection. Thus, the size of fastener required to attach the fixture and support the load may and often does demand a hole through the structure or supporting member that induces fatigue cracks in that part of the member immediately surrounding the hole. Where such a hole is required, the additional reinforcement or "beefing up" of the structure in the area in and around the hole to prevent fatigue failure results in an objectionable increase in weight.

In order to optimize the weight to strength ratio of fatigue critical structures with attached brackets or fixtures, it is important that the fastener hole or holes be held to a minimum size. Often this limitation results in an inadequate connection strength and will not withstand the normal or the expected use in service. Wherever possible, resort is made to an adhesive between the fixture and supporting surface to avoid any weakening whatever in the structurally critical supporting structure. Complications arise, however, when a combination of adhesive and fastener is employed. Foremost of these is the adhesive or bond line thickness which is difficult, if at all possible, to maintain and control during the fastener installation. Also, when and if adequate, this adhesive layer obstructs an electrical flow or ground path in certain installations. Also, it interferes with bucking or bucktail upsetting operations where rivets are used as the fasteners.

The present invention is, therefore, directed toward improvements in the design of such fixtures whereby they are capable, in a positive and repetitive manner, of connections and installations having optimum weight to strength properties. This is essentially accomplished by precisely controlling the bond line thickness between the fixture and supporting surfaces so that the adhesive may be employed to maximum strength advantage. This permits the use of fasteners of minimum size with the fastener and adhesive more nearly sharing the load and constituting a composite connecting agent. An ultimate load path across the connection is thereby produced that is least conducive to fatigue cracks in the structure around the attaching hole or holes.

More specifically, a predetermined bond line dimension is effected by the provision of an appropriate number of bosses on the fitting all extending from a surface thereof a predetermined distance to locate the faces in a common plane for abutment against the surface of the supporting structure. This establishes and maintains a precisely controlled space dimension for the adhesive material. At the same time, the transverse dimension of each boss may be established to a minimum necessary for piercing, and the passage of a fastener or rivet therethrough.

Once installed, the instant fixture becomes a permanent attachment, in effect an integral part of the supporting structure. This results from the proposed design by which the adhesive serves to bond the fixture to the adjacent structure while the rivets, among other things, serve to prevent shear forces from acting thereon that tend to separate or destroy the bond. This allows for greater torque forces than otherwise possible to be applied to the load supporting projection for the removal and replacement thereof from and to the fixture without an attendant weakening of fixture to structure connection.

At the same time, the proposed fixture allows for good surface to surface abutment between the supporting surface and fixture to assure a better rivet bucking where required. It also allows for metal to metal contact in the case of structural applications requiring a good ground path to structure.

Figure 2:
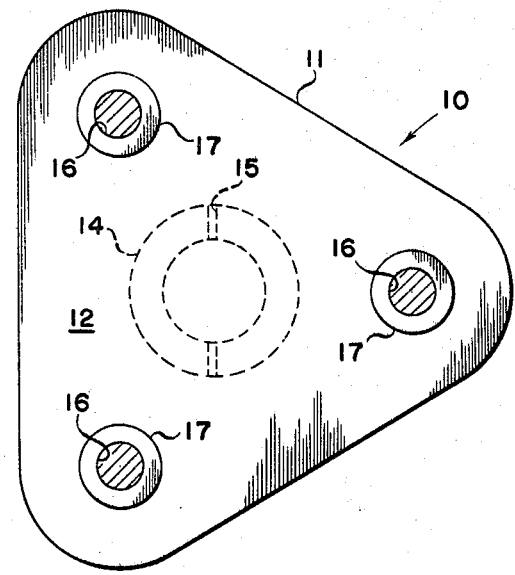

With the above and other objects in view as will be apparent, this invention consists in the construction, combination and arrangement of parts all as hereinafter more fully described, claimed and illustrated in the accompanying drawings wherein:

FIGURE 1 is a transverse section taken through a fixture typical of the type contemplated herein to show primarily the critical construction thereof in the area of and adjacent a supporting structure, only a fragment of which is shown; and FIGURE 2 is a bottom plan view of the fixture illustrated in FIGURE 1 to show the surface thereof adapted to be disposed in abutment against and secured to the supporting structure.

Referring more particularly to the drawings, 10 designates a fixture constructed in accordance with the teachings hereof. This fixture 10 is formed by a base or mounting plate 11 preferably having a generally triangular configuration defining a surface 12 to be associated with a supporting structure 13 in a manner which will become more apparent hereinafter. Projecting at right angles from the plate 11 in opposition to the surface 12 is an integral attachment element 14 adapted to connect an associated fitting or load (not shown). For purposes of illustration, this attachment element 14 is drilled and tapped in order to provide means through which the associated load or part is secured thereto with a transverse hole 15, if necessary, to permit inspection of the stud or bolt to assure full depth stud insertion.

Piercing the plate 11 is a plurality of holes 16 corresponding in number and size to fastener holes in the supporting structure 13 which is determined by the integrity of the structure 13 and the size of the fastener hole it will tolerate without exceeding its fatigue strength capabilities. Typically fastener holes do not exceed about 3/32 of an inch.

The plate 11 is formed or otherwise provided with an enlargement or boss 17 on the surface 12 around each hole 16. Each boss 17 is of a predetermined size and area, leaving an aggregate remaining surface area to receive an adhesive as will be described and of a size consistent with good adhesion considering size and strength factors of the structure 13 and the fasteners to be used. The outer surfaces of the several bosses 17 regardless of the number are so disposed that they establish a plane adapted to abut in face to face contact with the associated surface of the supporting structure 13 and are located relative to each other in such a manner as to assure stability. Preferably, each boss 17 is located inwardly of the outermost edge or edges of the plate 11 for reasons to become more apparent.

The thickness of each boss 17 is predetermined whereby the adhesive when ultimately applied to the remaining surface of the plate 11 has a controlled thickness. In the preferred embodiment as depicted, this thickness is approximately .010 of an inch plus or minus .005 so that when the surfaces of all of the bosses 17 abut the surface of the structure 13 as stated a space 18 of approximately .010 of an inch thickness is established.

When the fixture 10 is to be installed, the surfaces 12 and 13 are covered with an appropriate adhesive 19 so as to completely cover the areas to a thickness in excess of that of the space 18. Preferably a polysulfide sealing compound is employed as the adhesive primarily because of its ease of handling, peel strength and anticorrosive properties. A fastener, for example a rivet 20, is mounted in each hole 16 and driven home, the pressure thereby applied compresses the adhesive 19 in the space 18 assuring complete and uniform bonding of the entire surface 12 with the adjacent surface of the structure 13. The predetermined dimension of the space 18 establishing the bond line thickness of about .010 of an inch is maintained due to the several bosses 17 and the excess adhesive is extruded. Since the bosses 17 are located within the perimeter of the plate 11, the adhesive 19 completely surrounds each boss and produces good peripheral bonding as well as in the central area of the plate 11. The excess adhesive thus extruded from the fixture 10 may be wiped from around the perimeter thereof.

It is apparent that the foregoing construction and arrangement allows for the uniform and total application of the adhesive 19 on and over the entire area of the surfaces 12 and 13 with the outer surfaces of the several bosses 17 virtually clean due to extrusion. The adhesive 19 in conjunction with the fasteners 20 thereby constitutes an integral part of the connecting agent, i.e., more nearly shares in the ultimate connection of maximum strength. This contribution of the adhesive 19 in the total connection permits the use of fasteners 20 designed to minimum size. These several fasteners 20 serve the additional purpose of assuring a good connection by maintaining the fixture 10 and structure surfaces immovable until the adhesive 19 has fully cured. Thereafter, the fixture 10 becomes for all intents and purposes an integral part of the structure 13 and loads imposed through the attachment element 14 are transmitted into a relatively large area of the surface of the structure 13.

At the same time, the fasteners or rivets 20 resist torque loads applied in the installation of the load-supporting fitting (not shown) in the attachment element 14 as well as subsequent removal and replacement thereof, if necessary. The shear forces are thereby prevented from disturbing the bond or connection effected by the adhesive 19.

While the above disclosure is directed to what is believed to be a most practical and preferred embodiment of the invention, it is apparent that departures from the specific structure shown will suggest themselves to those skilled in the art and may be made without departing from the true spirit and scope of the invention. It is, therefore, intended to cover in the appended claims all such variations as fairly fall within the scope of these claims.

What is claimed is:

1. A mounting fixture comprising:
   a base plate defined by a supporting structure confronting surface having a marginal edge portion and an unbroken central area disposed in a common plane;
   an integral load-attaching element extending from said base plate in opposition to said surface;
   a plurality of bosses projecting from said surface, each said boss being intermediate said marginal edge portion and said unbroken central area, the projection of each boss being substantially uniform with that of each other said boss and in a direction that is substantially normal to said surface proximate thereto, each said boss having an outer face for flush abutment against a supporting surface whereby said supporting structure confronting surface is maintained a substantially uniform distance from the supporting surface when said bosses contact such supporting surface, such distance being that of the amount of projection of said bosses from said supporting structure confronting surface; and
   an aperture piercing each of said bosses substantially normal to the outer face of said bosses.

2. The fixture of claim 1 wherein said substantially uniform distance is approximately .010 of an inch and said aperture has a diameter not in excess of 3/32 of an inch.

3. The fixture of claim 1 wherein said supporting structure confronting surface is generally triangular and one of said bosses is located proximate each angle thereof.

4. The fixture of claim 1 wherein said load attaching element projects at right angles from said base plate, is tubular, being provided with internal engagement means to attach said load and is pierced at its base by at least one transverse hole.

5. The fixture of claim 1 including an adhesive material covering said marginal edge portion and said unbroken central area and having a transverse dimension not less than the projection of said bosses.

References Cited

UNITED STATES PATENTS

| 1,332,517 | 3/1920 | Owens | 248—314 |
| 2,215,331 | 9/1940 | Marsh | 248—223 |
| 2,275,007 | 3/1942 | Caestecker | 248—217 |
| 2,385,296 | 9/1945 | Moore | 248—304 |
| 2,679,998 | 6/1954 | Keller. | |
| 3,124,327 | 3/1964 | Meszaros | 248—74 |

ROY D. FRAZIER, Primary Examiner

J. FRANKLIN FOSS, Assistant Examiner

U.S. Cl. X.R.

248—44, 205, 346